(12) United States Patent
Guthrie et al.

(10) Patent No.: US 9,462,241 B2
(45) Date of Patent: Oct. 4, 2016

(54) HIGH EFFICIENCY DYNAMIC COLOR CONTROL MANAGEMENT SYSTEM

(75) Inventors: Simon Guthrie, Kitchener (CA); Terry Schmidt, Wellesley (CA)

(73) Assignee: CHRISTIE DIGITAL SYSTEMS USA, INC., Cypress, CA (US)

( * ) Notice: Subject to any disclaimer, the term of this patent is extended or adjusted under 35 U.S.C. 154(b) by 656 days.

(21) Appl. No.: 13/339,508

(22) Filed: Dec. 29, 2011

(65) Prior Publication Data

US 2013/0169659 A1 Jul. 4, 2013

(51) Int. Cl.
*G03B 21/20* (2006.01)
*H04N 9/31* (2006.01)

(52) U.S. Cl.
CPC .......... *H04N 9/3155* (2013.01); *H04N 9/3182* (2013.01)

(58) Field of Classification Search
CPC ........... H04N 11/02; H04N 9/31; G02G 5/02
USPC .......................................................... 353/85
See application file for complete search history.

(56) References Cited

U.S. PATENT DOCUMENTS

| | | | |
|---|---|---|---|
| 6,683,657 B1 | 1/2004 | Miyawaki | |
| 2003/0214633 A1* | 11/2003 | Roddy et al. | 353/31 |
| 2004/0227456 A1 | 11/2004 | Matsui | |
| 2005/0122481 A1* | 6/2005 | Yamasaki et al. | 353/31 |
| 2006/0285085 A1 | 12/2006 | Hirota | |
| 2008/0143970 A1* | 6/2008 | Harbers et al. | 353/31 |
| 2008/0253453 A1* | 10/2008 | Fuchigami | 375/240.12 |
| 2009/0323026 A1* | 12/2009 | Mizushima | G03B 21/14 353/31 |
| 2010/0002200 A1* | 1/2010 | Pekarski | 353/85 |
| 2010/0182338 A1* | 7/2010 | Hedin et al. | 345/617 |

OTHER PUBLICATIONS

Corresponding European Patent Application No. 12195307.9 Search Report dated Mar. 20, 2013.

* cited by examiner

*Primary Examiner* — Sultan Chowdhury
*Assistant Examiner* — Danell L Owens
(74) *Attorney, Agent, or Firm* — Perry + Currier, Inc.

(57) ABSTRACT

A method and apparatus are disclosed that use one or more of advanced signal processing or auxiliary metadata to detect maximum video pixel drive levels required, in advance, for quickly reducing light source power levels to only supply what is absolutely required by the spatial light modulator for that time period. A spatial light modulator is controlled so as to compensate proportionally by increasing its throughput. Thus, the image brightness can be preserved at a lower average source power level resulting in increased lifetime of the light source and lower operating cost on a per-hour basis and/or projection at a desired brightness using a lower cost light source than prior art systems.

15 Claims, 4 Drawing Sheets

HIGH EFFICIENCY DYNAMIC COLOR CONTROL MANAGEMENT SYSTEM

BACKGROUND OF THE INVENTION

1. Field of the Invention

The present invention is directed to digital projection systems, and more particularly to a high efficiency dynamic color control management system.

2. Description of the Related Art

There is growing interest in high-quality digital projection systems that display images that can match or surpass the quality of film, especially in large venues. One solution utilizes a Digital Light Processor (DLP) as the image forming device.

One well known form of Digital Light Processing (DLP®) projection, originally developed by Texas Instruments, is based on the use of a source lamp, an illumination system, and a color splitting-recombining light engine. The optical function of the light engine is to split uniform illumination light into Red/Green/Blue (RGB) channels, direct the three channels onto respective spatial light modulators, such as imaging devices or optical panels such as an LCD (Liquid Crystal Display) or DMD (Digital Micromirror Device), and then re-combine all three channels into a single illumination light beam that is projected onto a screen via a projection lens.

The DMD is a MEMS (microelectromechanical) device consisting of microscopic mirrors that modulate light by independently flipping each mirror through a +−12 degree angle, between an "on" state for reflecting the source light to be viewed on screen and an "off" state for diverting the light to a light dump. Intermediate light intensities on screen are generated by toggling the DMDs according to a pulse width modulation (PWM) method, at frequencies above human perception in order to achieve time-averaged values. In this respect, the exact grey level produced depends on the pulse-width-modulated (PWM) duty cycle.

Conventional high luminance projectors currently use discharge lamps as light sources (e.g. Xenon arc lamps), although projectors that use solid state light sources, such as LEDs and lasers, are beginning to emerge on the digital projector market. Projectors that use solid state light sources offer advantages over discharge lamps in terms of longer lifetime and increased reliability. Furthermore solid state light sources can be characterized by a widely increased color gamut, and greater spectral purity.

Whether a projector uses a conventional arc lamp or newer laser or LED illumination, key design objectives include dynamic range, power conservation and lifetime of the illumination source.

A system commonly referred to as a "dynamic iris" has been used for many years in lamp-based projection systems to increase dynamic range from maximum peak light output levels to the darkest scene (i.e. "black level"). The dynamic iris is positioned between the lamp and the DMD. Many times per second, the projector evaluates the overall brightness of the image being projected and then opens or closes the iris to allow more or less light through. The on/off contrast rating is based on the whitest white with the iris open, and the blackest black when the iris is closed. However, not all of the light generated by the illumination source is actually used. For example, light may be absorbed by the iris (i.e. does not reach the DMD) or is "dumped" by the DMD. Consequently, dynamic iris systems do not result in a reduction in lamp power usage. Since lifetime of the illumination source is inversely proportional to the power drive levels of the light source, there is therefore no increase in lamp lifetime.

The inventors have discovered that the average brightness levels or APL (average picture level) is often less than 50% for most video and movie content. Peak pixel levels can also be much lower on a frame-by-frame and color-by-color basis. Many scenes are very dark in nature with no pixels requiring full brightness levels and therefore also would not require full power illumination for correct display levels. Also, the light output of a discharge lamp cannot be quickly or reliably modulated. Therefore, for the bulk of content, light is generated by the lamp that is not being used to project an image. This has many costs, notably in terms of system efficiency (wasted energy to generate unused light), thermal management (the unused light is lost as heat within the system), and source lifetime (lowering the power can increase the time to failure of a light source).

The inventors have discovered that if the input power level to the projector can be reduced, while maintaining output power for allowing the brightest pixels to be displayed at peak colour or luminance, then the light source lifetime can be significantly increased, and the black levels of the darkest scenes decreased thereby increasing the observable contrast ratio.

SUMMARY OF THE INVENTION

A method and apparatus are disclosed that use one or more of advanced signal processing or auxiliary metadata to detect maximum video pixel drive levels required, in advance, for quickly reducing light source power levels to only supply what is absolutely required by the spatial light modulator for that time period. Spatial light modulators such as DMDs can only reduce light levels down from a maximum illumination level, provided by the light source. If however, for a period of time such as a video line, frame or even an entire scene of source content (e.g. a particular cinematic scene within a movie), only a reduced maximum light level is required, the actual light output of the source may be decreased instead of simply redirecting (i.e. "dumping") the luminous flux. Modern solid state illumination systems such as laser or LED illumination systems, can respond very quickly to changes in light flux. The spatial light modulator is controlled so as to compensate proportionally by increasing its throughput. Thus, the image brightness can be preserved at a lower average source power level resulting in increased lifetime of the light source and lower operating cost on a per-hour basis and/or projection at a desired brightness using a lower cost light source than prior art systems.

Additionally, the method and apparatus disclosed herein can result in better black level performance and a wider dynamic range for darker scenes, and can be applied to new projector designs or used to upgrade existing non-laser projectors.

It is an aspect of the present invention to provide a high efficiency dynamic color control management system.

The above aspects can be attained by a method of dynamic color control management system for use with a projector having a light modulator for modulating illumination from a light source: comprising receiving source content; generating a modulation control signal in accordance with said source content; analyzing said content in order to determine a peak value representing a maximum brightness level within said content; generating a power control signal for regulating power output from said light source so that said light source emits just enough illumination to reach said peak value; and controlling said modulation control signal for controlling said light modulator in accordance with said content and said peak value.

In another aspect, a projector is set forth, comprising: a plurality of solid state light sources; an image processor for (i) receiving source content, (ii) generating a modulation control signal in accordance with said source content, (iii) analyzing said content in order to determine a peak value representing a maximum brightness level within said content, (iv) generating a power control signal in accordance with said peak value; a source driver for receiving said power control signal and in response regulating power output from said light sources so as to emit just enough illumination to reach said peak value, and a plurality of light modulators for receiving said modulation control signal and in response modulating light from respective ones of said light sources in accordance with said content and said peak value.

These together with other aspects and advantages which will be subsequently apparent, reside in the details of construction and operation as more fully hereinafter described and claimed, reference being had to the accompanying drawings forming a part hereof, wherein like numerals refer to like parts throughout.

DETAILED DESCRIPTION OF THE PREFERRED EMBODIMENTS

Figure 1:
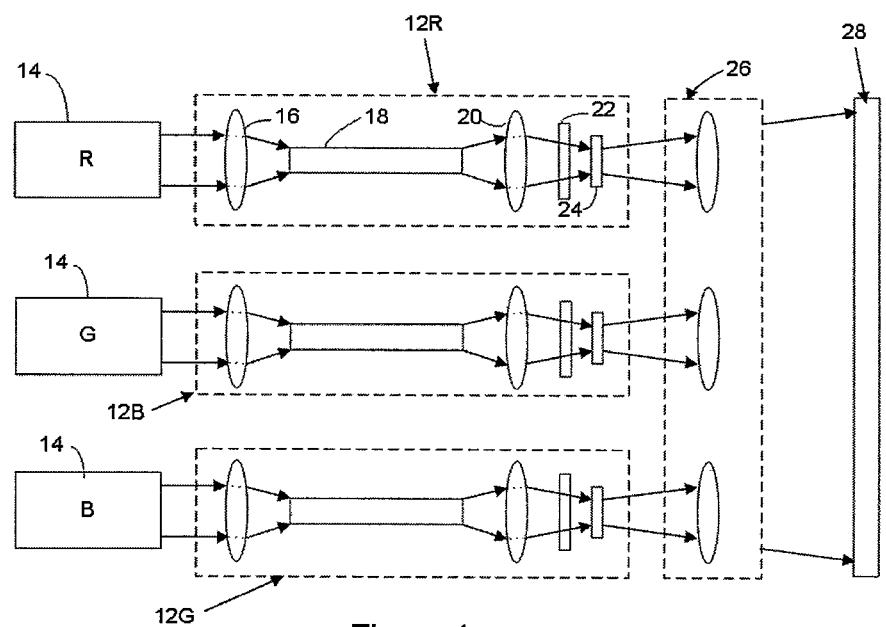
FIG. 1 is a block diagram showing illumination and optical components of a DLP projector, according to the prior art.

With reference to FIG. 1, three light modulator blocks 12R, 12G and 12B are provided for modulating the primary Red, Green, or Blue (RGB) colors from respective laser light sources 14. Each laser light source 14 may include a single light source or multiple light sources, as will be understood by a person of skill in the art. For example, a typical cinema projector may include over 300 laser light sources (e.g. 70 red laser lights sources, 40 green laser lights sources and 200 blue laser lights sources).

In each of the light modulator blocks 12R, 12G and 12B, a lens 16 directs light into a light guide 18. At the output of light guide 18, a further lens 20 directs light through an integrator rod 22 to a spatial light modulator 24. As discussed above, spatial light modulator 24 is typically a DMD comprising an array of micromirrors, each micromirror being selectively actuable to modulate the light beam from the associated laser light source 14R, 14G or 14B. Projection optics 26 direct the modulated light to a display surface 28.

The overall arrangement shown in FIG. 1 may be modified or varied, as will be understood by a person of skill in the art. For example, each laser light source 14 may be replaced by an LED light source, light from the lens 16 may be directed to integrator rod 22 without the use of light guide 18, etc.

Before turning to an exemplary embodiment, a brief description is provided below of two key concepts upon which this invention is based: additive colour generation and frame peak.

In an additive color system with three primaries (typically RGB, as in the projector 10, but not necessarily RGB), any color within the gamut volume formed by those primaries can be generated by adding up varying amounts of the three primaries.

First, consider three primary chromaticities (including luminance) found to be as follows in the CIE 1931xyY color space:

$$P1=(P1_x, P1_y, P1_Y)$$

$$P2=(P2_x, P2_y, P2_Y)$$

$$P3=(P3_x, P3_y, P3_Y)$$

This expression of the primaries must be converted to tristimulus values. The conversion for P1 is as follows, and is similar for P2 and P3:

$$P1_X = \left(\frac{P1_x}{P1_y}\right)P1_Y$$

$$P1_Y = P1_Y$$

$$P1_Z = \left(\frac{1-P1_x-P1_y}{P1_y}\right)P1_Y$$

In order to display a particular chomaticity and luminance, or color point (Cx, Cy, Cz), varying amounts of the three primaries are mixed together in amounts defined by the coefficients (ρ,γ, β), as follows, where the coefficients can have values in the range {0 . . 1}:

$$C_X=\rho P1_X+\gamma P2_X+\beta P3_X$$

$$C_Y=\rho P1_Y+\gamma P2_Y+\beta P3_Y$$

$$C_Z=\rho P1_Z+\gamma P2_Z+\beta P3_Z$$

By specifying the color point to be reproduced in a tristimulus space, these equations can be solved for the coefficients. If the solution yields values outside the range {0 . . 1}, then the specified color point is unachievable with the 3 primaries.

Next, consider the color point required in a specific dataset. This dataset can be the pixels in a single video line, video frame, scene, or the entire work. For example, with 2K digital cinema, a frame of data is a collection of pixels (2048×1080), with RGB tristimulus values expressed to 12 bits of accuracy. Each of these pixels requires its own specific mix of P1, P2, and P3 (ρ, γ, β). The dataset will be characterized by the highest (peak) values of the coefficients (ρ,γβ), denoted as ($\rho_M$, $\gamma_M$, $\beta_M$). It should be noted that no single pixel need have all three of these values. Typically, the maximum coefficient values will be derived from different pixels.

Having determined, $\rho_M$, $\gamma_M$, $\beta_M$ it is possible to define the color produced if the projector 10 were to project these intensities at the same pixel (although, as indicated above, most scenes are such that this color will not typically be projected anywhere on screen 28). The defined color is denoted as the frame peak (F), which is likely to be brighter than any pixel projected on the screen, but contains just enough of P1, P2, and P3 that all colors in a given frame can be produced. The frame peak therefore includes just enough of each of the three primaries that any chromaticity and luminance intended to be displayed in a particular frame can be displayed. The frame peak (F) may be expressed as:

$$F_X = \rho_M P1_X + \gamma_M P2_X + \beta_M P3_X$$

$$F_Y = \rho_M P1_Y + \gamma_M P2_Y + \beta_M P3_Y$$

$$F_Z = \rho_M P1_Z + \gamma_M P2_Z + \beta_M P3_Z$$

The same expression holds true for a video line peak, "scene" peak or a "work" peak where the dataset comprises all pixels in a single video line, scene or an entire work, respectively.

The frame peak (F), or the scene peak or work peak, may be provided to the projector by the content creator in metadata included in the digital content. Alternatively, the frame peak (F) can be calculated on-the-fly by the projector or calculated ahead of time by a server controlling the projector, as discussed in greater detail below with reference to FIG. 4, and provided to the projector as metadata. Once the frame peak (or the scene peak or work peak) is known, the primaries can then be modulated so that they emit just enough light to generate the frame peak. This allows all of the colors and brightness specified by the content creator to be displayed, without wasting as much light as prior art constant-output light sources.

Figure 2A:
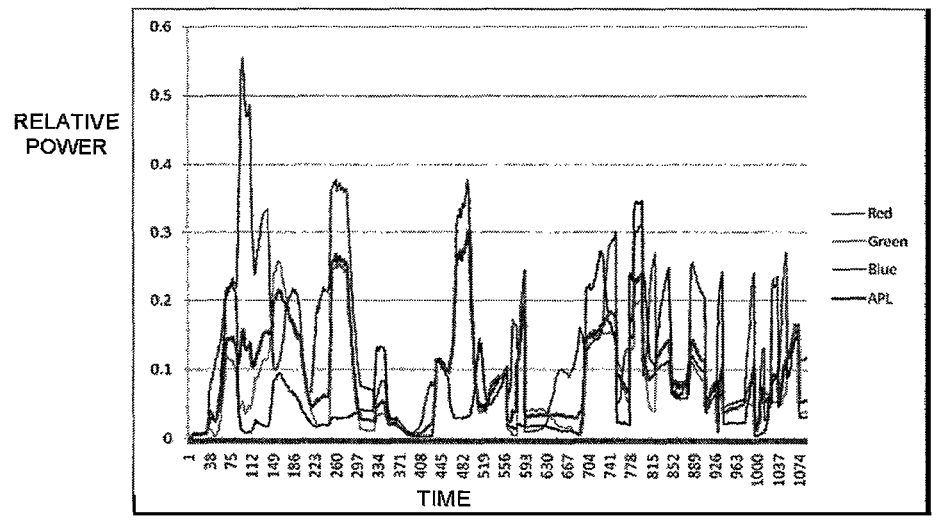
FIGS. 2A and 2B are a graph and bar chart, respectively, showing RGB and APL data over time for exemplary movie content.
Figure 2B:
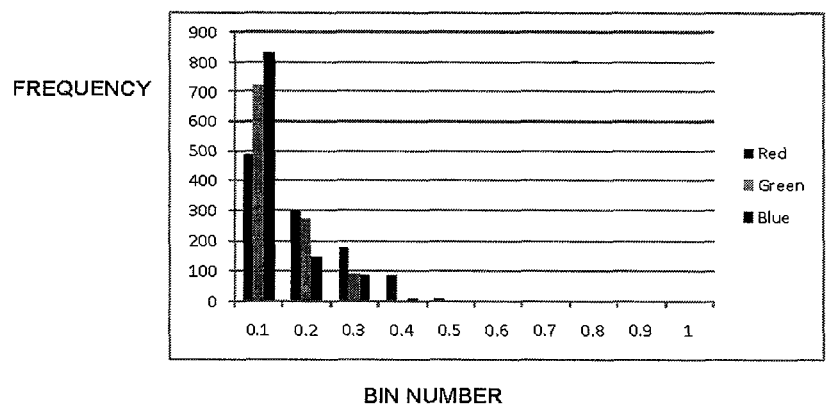

As discussed above, the inventors have discovered that the average brightness levels or APL (average picture level) is often less than 50% for most video and movie content. FIG. 2A shows the relative power of the red (R), green (B) and blue (B) light projected by light modulator blocks 12R, 12G and 12B, and the APL (average picture level) according to scene content over time. The APL is calculated as the weighted sum of RGB=21% R+72% G+7%B (i.e. according to sRGB/REC709). FIG. 2B shows the same data plotted as bin number v. frequency, where a smaller bin number indicates a wider dynamic iris aperture.

Figure 3:
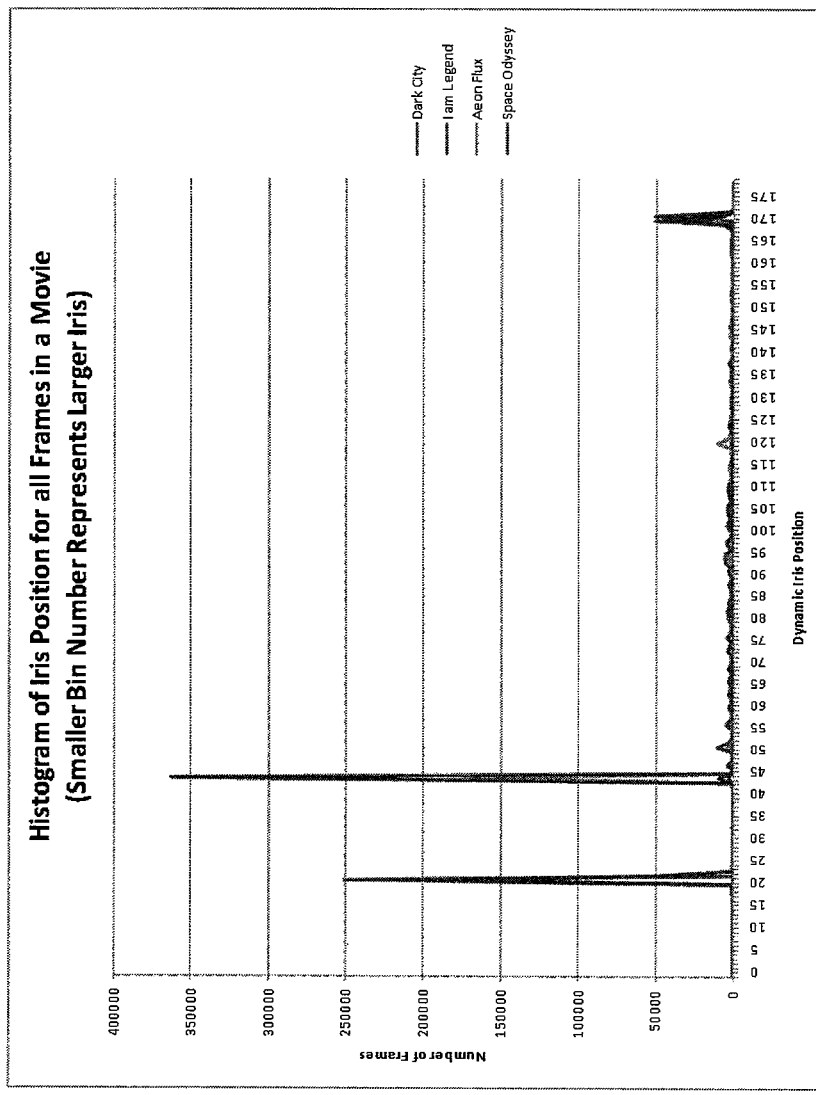
FIG. 3 is a histogram of dynamic iris aperture over time for four representative movies.

FIG. 3 is a histogram showing dynamic iris aperture v. number of frames for four representative movies, where the large peaks at the left of the histogram represent bright scenes.

The data illustrated in FIGS. 2 and 3 confirms that although the lasers 14 are configured to be driven at full power, the APL is much less than 100% almost all of the time for film and broadcast content, and the peak brightness for R, G, or B within a frame is usually less than a 100%. Darker frames that have no bright pixels simply cause more light to be deflected by the DMDs into the light dump. Setting R, G, and B at 100% wastes substantial electrical power, heats the DMD much more than necessary and puts unnecessary heat into the heat dump. Running R, G, and B at 100% is also a waste of dynamic range.

Figure 4:
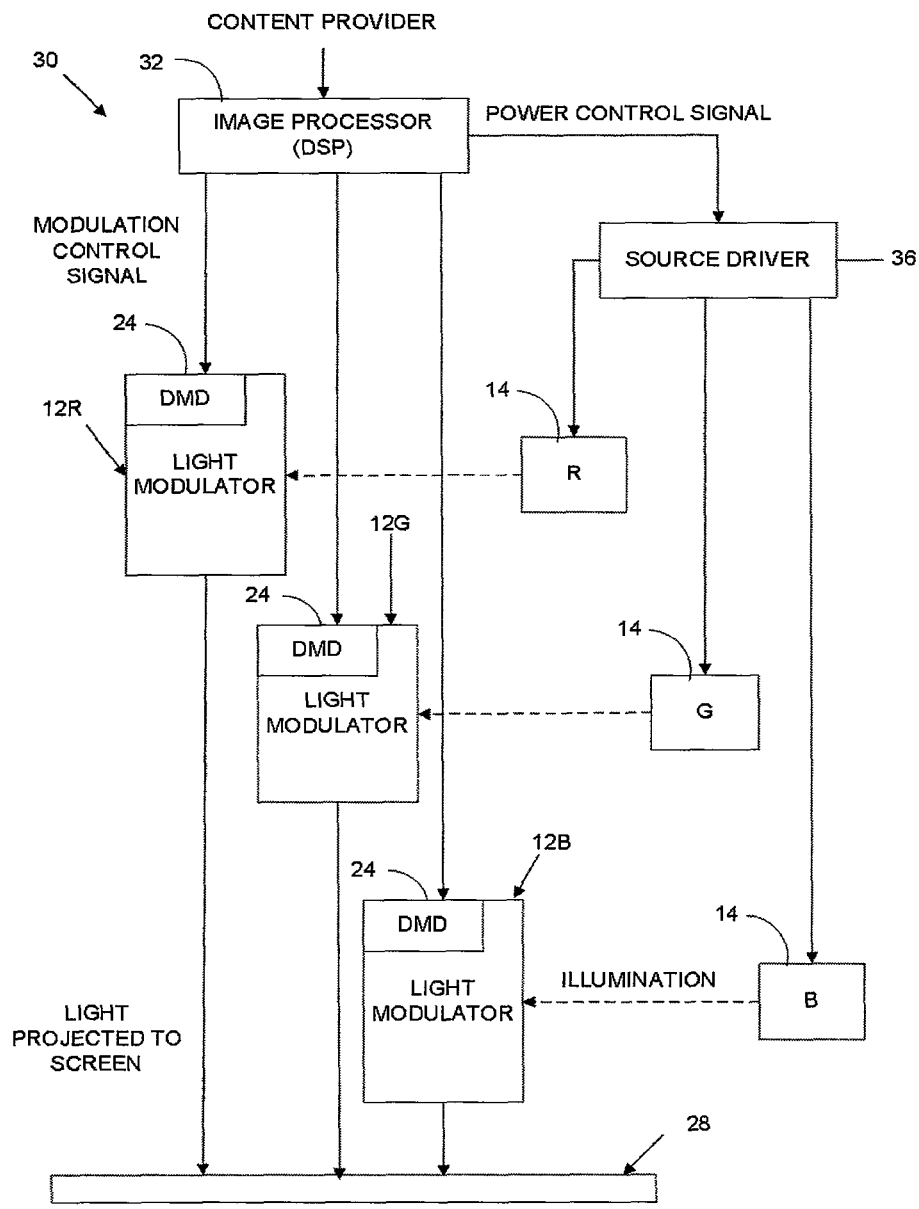
FIG. 4 is a block diagram of a projector is shown incorporating a high efficiency dynamic color control management system according to an exemplary embodiment.

Turning now to FIG. 4, a projector 30 is shown incorporating a high efficiency dynamic color control management system according to an exemplary embodiment for digital cinema. It will be understood that embodiments are possible for other content streams (e.g. BluRay, broadcast television, etc.) Source content, such as a movie, is received from a content provider. The content includes all sound, picture, and data elements of a production assembled into a Digital Cinema Distribution Master (DCDM) that is incorporated into a hard drive, optical disk (such as DVD), received via satellite, etc. The images and sound are then compressed, encrypted, and packaged to form a Digital Cinema Package (DCP).

The source content is received by an image processor 32, such as a digital signal processor (DSP) which in response controls light modulator blocks 12R, 12G and 12B to modulate light from laser light sources 14, as discussed above in connection with FIG. 1. More particularly, image processor 32 generates a modulation control signal to control operation of the DMD devices 24 and a power control signal for controlling the laser light sources 14.

According to one embodiment, image processor 32 analyzes the red green and blue video streams from the source content prior to display, in order to determine the peak pixel level for each color and in response generates the frame peak (F), as discussed above. The analyzing performed by image processor 32 is simple but can be time consuming. For example, a typical feature length movie comprises approximately 4 GB of data. However, in some applications it may not be necessary to analyze the entire movie. Instead, it may be sufficient to analyze only the start of the movie, which often provides similar results as the middle or the end of the movie. Alternatively, as discussed above, a plurality of scenes (e.g. 10-15 minutes each) may be analyzed to generate "scene" peak data.

In another embodiment, the frame peak (F), or the "scene" peak or "work" peak, are contained within the source content as auxiliary metadata, thereby alleviating the requirement to analyze the digital content "on-the-fly" using image processor 32. For example, metadata is currently included in source content for such things as subtitles and "rumble seats". Provided the DCP conforms to an industry-standard 20 Mbits/s bandwidth limitation, any kind of metadata can be embedded.

The image processor 32 uses the frame peak (F) to generate the power control signal for application to a source driver 36 which, in response, regulates the power applied to laser light sources 14 so that they emit just enough illumination in the primaries to reach the frame peak (F). For example, if the frame peak (F) indicates that only 50% red is required, 75% of green is required and 30% blue is required, then the illumination power of the laser light sources 14 is reduced to these levels (subject to linearities of the illumination source) and the projector recalibrates itself to the new relative intensities by adjusting the DMD control signals accordingly to compensate for the reduced laser output. The frame/scene is displayed and the process is repeated for subsequent frames/scenes.

In another embodiment rather than reducing the power output of all of the laser light sources 14 some of the laser light sources 14 may continue to operate at full power while the signals output from source driver 36 are reset to zero for other ones of the laser light sources 14 so as to effectively turn off those light sources, with the result that the cumulative output of all laser light sources 14 is such as to emit just enough illumination in the primaries to reach the frame peak (F).

The present high efficiency dynamic color control management system described above uses illumination sources, such as lasers, in a way that minimizes power consumption while at the same time offering improvements to black levels and image detail.

In terms of power consumption and device lifetime, since the lasers 14 are driven at less than full output, they require less electrical power. Since the lasers 14 are, on average, driven below full output then the elapsed hours of use before an end of life condition occurs is increased. In terms of thermal management, since the lasers 14 only deliver the light that is actually needed, then there is a minimization of light that will be converted to heat in the projector. If a priori assumptions can be made about the average light levels, then thermal management systems can be designed to tighter specifications. In terms of contrast, since the DMDs at full output display low brightness content (because the source has been dimmed), then the content can be re-expressed (i.e. re-mastered) to fit all of the 4096 (12-bit) digital levels between 0 and Max instead of the customary 4096 levels between 0 and 14 ftL. This results in finer black levels than with traditional light sources for a given scene (i.e. where levels range from zero to a scene maximum), albeit at the expense of white levels that can no longer be displayed although, upon re-mastering to ignore white levels that are not part of the content.

The many features and advantages of the invention are apparent from the detailed specification and, thus, it is intended by the appended claims to cover all such features and advantages of the invention that fall within the true spirit and scope of the invention.

One contemplated application is to provide black level compensation for artifacts that can sometimes appear in night scenes (e.g. flashing red light of a police car at night). By knowing the scene peak value, the red laser power level can be reduced whenever the red police light flashes.

According to an alternative embodiment, rather than reduce illumination source power levels based on frame peak value (F), it is contemplated that the projector may be designed for overall lower power levels and then overdriven for sort periods of time to attain required peak illumination levels.

Further, since numerous modifications and changes will readily occur to those skilled in the art, it is not desired to limit the invention to the exact construction and operation illustrated and described, and accordingly all suitable modifications and equivalents may be resorted to, falling within the scope of the invention.

What is claimed is:

1. A method of dynamic color control management for use with a projector having a light modulator for modulating illumination from red, green and blue light sources, each of which comprises a plurality of solid state light sources, comprising:
   receiving source content;
   generating a modulation control signal in accordance with said source content;
   determining a peak value of red, green and blue in a dataset of primary chromaticities in amounts defined by respective maximum coefficients required for a cumulative maximum brightness level within said content;
   generating a power control signal for regulating power output from each of said solid state light sources so that said solid state light sources emit just enough illumination to reach said peak value; and
   controlling said modulation control signal for controlling said light modulator in accordance with said content and said peak value.

2. The method of claim 1, wherein said peak value is a frame peak representing maximum pixel brightness within a frame of said source content.

3. The method of claim 1, wherein said peak value is a line peak representing maximum pixel brightness within a video line of said source content.

4. The method of claim 1, wherein said peak value is a scene peak representing maximum pixel brightness within a scene of said source content.

5. The method of claim 1, wherein said peak value is a work peak representing maximum pixel brightness within the entirety of said source content.

6. The method of claim 1, wherein said peak value is a frame peak representing maximum pixel brightness within a frame of said source content.

7. A projector, comprising:
   red, green and blue light sources, each of which comprises a plurality of solid state light sources;
   an image processor for (i) receiving source content, (ii) generating a modulation control signal in accordance with said source content, (iii) determining a peak value of red, green and blue in a dataset of primary chromaticities in amounts defined by respective maximum coefficients required for a cumulative maximum brightness level within said content, (iv) generating a power control signal in accordance with said peak value;
   a source driver for receiving said power control signal and in response regulating power output from each of said solid state light sources so as to emit just enough illumination to reach said peak value, and
   a plurality of light modulators for receiving said modulation control signal and in response modulating light from respective ones of said light sources in accordance with said content and said peak value.

8. The projector of claim 7, wherein said solid state light sources are red, green and blue lasers.

9. The projector of claim 7, wherein said solid state light sources are red, green and blue LEDs.

10. The projector of claim 7, wherein said plurality of light modulators are digital micromirror devices (DMDs).

11. The projector of claim 7, wherein said peak value is a line peak representing maximum pixel brightness within a video line of said source content.

12. The projector of claim 7, wherein said peak value is a scene peak representing maximum pixel brightness within a scene of said source content.

13. The projector of claim 7, wherein said peak value is a work peak representing maximum pixel brightness within the entirety of said source content.

14. The projector of claim 7, wherein said power control signal causes the output of each of said light sources to be reduced so as to emit just enough illumination to reach said peak.

15. The projector of claim 7, wherein said power control signal causes a first plurality of said light sources to operate at full power and a second plurality of light sources to effectively turn off such that the cumulative output of all light sources is such as to emit just enough illumination to reach said frame peak.

* * * * *